United States Patent [19]
Bryan, Jr. et al.

[11] 3,810,328
[45] May 14, 1974

[54] MULCH SHEET

[75] Inventors: Robert C. Bryan, Jr., Diamond Bar, Calif.; Joseph F. Price, Stone Mountain, Ga.

[73] Assignee: Ludlow Corporation, Needham Heights, Mass.

[22] Filed: Jan. 11, 1973

[21] Appl. No.: 322,637

[52] U.S. Cl. ................................... 47/9, 161/250
[51] Int. Cl. ............................................ A01g 7/00
[58] Field of Search ............ 117/155; 161/247, 249, 161/250; 47/9, 58; 162/204, 205, 206, 135

[56] References Cited
UNITED STATES PATENTS

| | | | |
|---|---|---|---|
| 1,870,110 | 8/1932 | Hall | 47/9 |
| 1,882,713 | 10/1932 | Angier | 47/9 |
| 2,685,150 | 8/1954 | Linehan | 47/9 |
| 2,740,742 | 4/1956 | Vaughan | 161/250 X |
| 3,012,928 | 12/1961 | Whitman | 162/135 |
| 3,104,197 | 9/1963 | Back et al. | 162/206 X |
| 3,402,086 | 9/1968 | Smith et al. | 161/250 |
| 3,418,396 | 12/1968 | Edwards et al. | 161/249 X |
| 3,493,464 | 2/1970 | Bowers et al. | 47/9 X |

OTHER PUBLICATIONS

Influences of ..., Liptay et al., J. Amer. Soc. Hort. Sci., 95(4), 1970, pp. 395–398 relied on, copy in Gp 330.

Primary Examiner—Robert E. Bagwill
Attorney, Agent, or Firm—Cesari and McKenna

[57] ABSTRACT

An improved mulch in sheet form which is adapted to hug the earth and consequently avoid interference with automated agricultural apparatus. The mulch is formed with an extensible kraft paper facing. The paper is selected to fade and become more reflective of the sun's rays as the growing season progresses. The disclosed crepe-backed construction also contributes a multi-directional strength characteristic to the sheet and allows use of a relatively thin plast coating.

9 Claims, 2 Drawing Figures

PATENTED MAY 14 1974  3,810,328

MULCH SHEET

BACKGROUND OF THE INVENTION

This invention relates to a novel agricultural mulch in sheet form.

Agricultural mulches in sheet form are old in the art and many sheet-type mulches have been developed and patented. The particular features of these patented mulches include accelerated decomposition (U.S. Pat. No. 3,341,351 to Feild; U.S. Pat. Nos. 3,454,510 and 3,592,792 to Newland et al; and means for accommodating the changes in the intensity of the sun's radiant heat during the growing season (U.S. Pat No. 3,181,273 to West et al; U.S Pat. No. 3,592,792 to Newland et al.). All of these constructions are rather expensive and fall short of forming ideal mulch product.

Moreover, in some agricultural applications, the known sheets were a considerable problem because they were so strong they tended to foul in automatic crop-processing machinery used in the fields.

SUMMARY OF THE INVENTION

Therefor, it is an object of the invention to provide an improved agricultural mulch and adapted for use in sheet form.

It is a further object of the invention to provide such a mulch that is largely degraded during the growing season so that it may be easily dispersed in the soil.

Another object of the invention is to provide such a degradable mulch that changes its relative reflectance and absorptivity during the course of the growing season in general conformity with the need to first enhance the warming of the soil and then to protect the soil against excess heat from the rays of the sun.

Still another object of the invention is to provide an improved agricultural mulch which has an excellent drapeability and, consequently, hugs the ground avoiding entanglement with agricultural machinery.

Other objects of the invention will be obvious to those skilled in the art on reading the instant application.

The above objects have been substantially achieved by the construction of a mulch in sheet form and composed of the following:

1 A sun-bleachable extensible paper.

2 A thin coating of black pigmented organic resin on one side of the extensible paper.

Extensible natural kraft paper having a basic weight of from about 25 to 60 lbs. per ream is suitable for use. Such papers are well known in the art, and available under the trade designation "Clupak" by Cluett-Peabody Company and also from many other suppliers under the general designation of "extensible kraft paper."

The black resin coating is an opacifier which stops light from penetrating the mulch stimulating growth of weeds. The paper, in general, acts as a light shield, first increasing heat generation on the mulch and aiding the opacifying action and, as the season progresses, acting more as a radiation shield.

The "black" coating is suitably a carbon-black pigmented thermoplastic of about 0.0005 inches thickness. This coating may be based on a thermoplastic such as polyethylene, polypropylene, or poly(vinyl chloride) or it may be a wax-based hot melt coating similarly pigmented.

The important aspect of the invention is that use of an extensible paper gives a toughness which allows use of a relatively thin coating even for rugged applications. In turn, the thin coating co-acts with the extensibility of the paper to form an excellent ground-hugging mulch sheet. Moreover, the combination of a paper-based sheet, a very thin coating of plastic and better contact with soil and its organisms results in maturation of the mulch sheet to an easily frangible and degradeable state by the end of the growing season. It need not be laboriously removed from the land; it can be "plowed under." In addition, the one-side coating of pigmented resin results in a shrinkage effect once the coating starts to weather in the field; the result is that the mulch is pulled even more snugly against small mounds of the type encountered in, say, tomato fields.

In the most advantageous embodiment of the invention, a two-way extensible paper will be used in constructing the product of the invention. Such paper is typically prepared by ribbing extensible kraft with ribs about one-eighth inch apart and having a depth of about 25 percent of the thickness of the paper.

In the normal practice, the mulch of the invention is placed resin-coated side down. The darkish colored (natural) kraft upper coating together with the increased surface area of the extensible construction cause the paper to serve as a light-absorbing aid during the early part of the growing season. As the season progresses and sun grows hotter, the immature plants will no longer require this light-absorbing aid. The kraft will bleach during this period and consequently adapt itself to the requirement of the growing plants. In the past, black polyethylene mulch sheets have often required painting with reflective paint to reduce the heat-absorbing character of the mulch as the season progressed.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particualr case.

IN THE DRAWINGS

Figure 1:
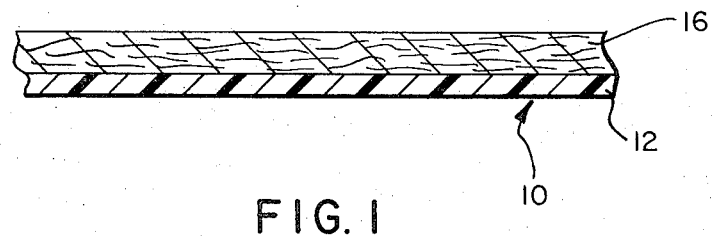
FIG. 1 is a section of a mulch sheet formed according to the invention.

FIG. 1 illustrates a mulch sheet 10 formed according to the invention and comprising a 0.0005-inch thick layer 12 of black polyethylene 14 and an extensible, natural kraft sheet 16.

Figure 2:
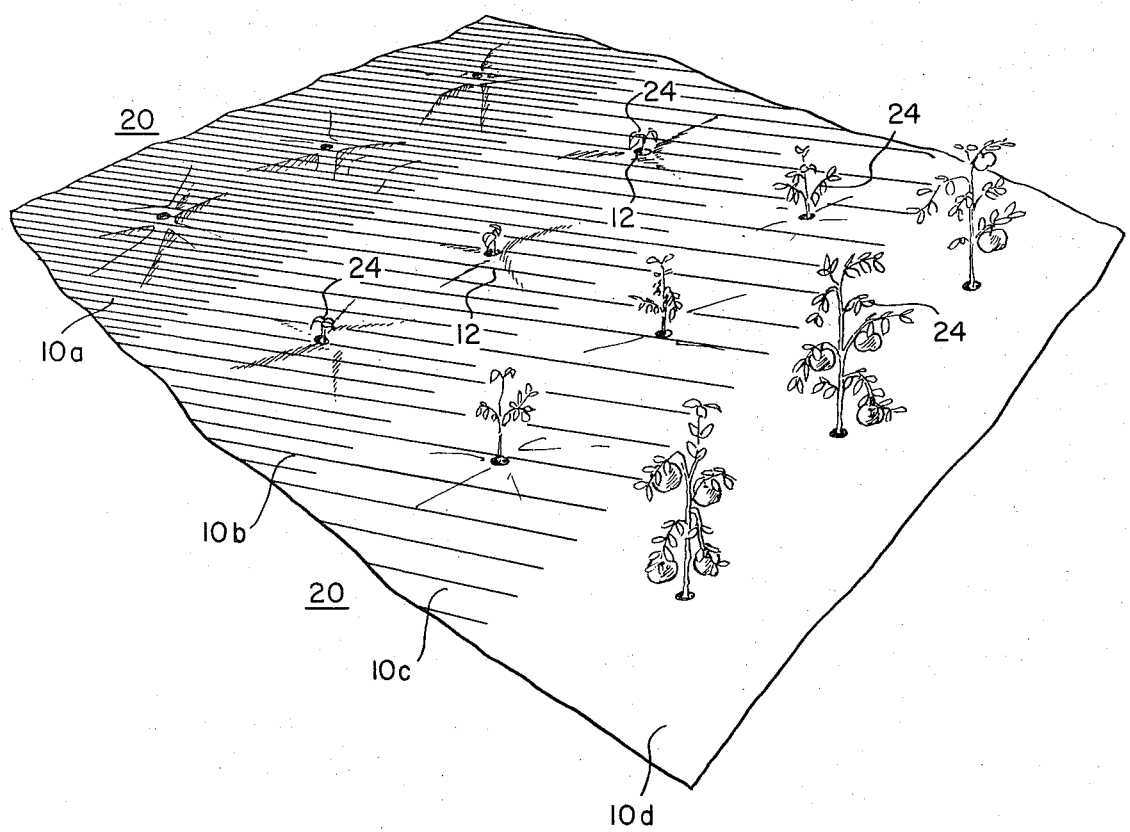
FIG. 2 is a perspective, somewhat schematic of a tomato plant field depicting the sheet thereon during the length of the growing season. The shading in FIG. 2 is not meant to be other than illustrative of a generally progressive change in reflectance; the precise degree of change is not meant to be illustrated on the drawings.

FIG. 2 is a representation of how this sheet performs in a tomato field during a typical April-through-July growing period. In April, a relatively dark film 10a is placed over the field 20 and provides a reasonable mulch fit over the field. By May the mulch, now identified as 10b has bleached somewhat and, on exposure to weather, pulled more snugly against the earth, and especially the small hillocks 22 about tomato plants 12. (The tomato plants 24 are not believed necessary to describe the invention.) In June and July the mulch (10c) has bleached to be an effective reflector.

At the end of the growing season, the thin mulch is sufficiently snug against the field that it does not interfere with harvesting machinery. Moreover, it is sufficiently frangible that it is readily broken up and distributed within the soil when the soil is turned over.

It is also to be understood that the following claims are intended to cover all of the generic and specific features of the invention herein described and all statements of the scope of the invention which might be said to fall therebetween.

What is claimed is:

1. In a process for mulching agricultural plants, the improvement comprising the steps of applying and maintaining on earth about said plants a sheet of mulch laminate having (a) an upper layer of an extensible natural kraft paper of a weight of from about 25 to 60 pounds per ream, said paper forming a means adapted to progressively bleach and substantially increase the light reflective properties thereof in response to sunlight during a growing season and, (b) a relatively thin lower layer of an opacifying organic resin composition, said lower layer being adhesively bonded to said paper.

2. A process as disclosed in claim 1 wherein said paper is extensible in both the machine and cross-machine directions.

3. A process as disclosed in claim 2 wherein said lower layer is formed of a black-pigmented polyethylene coating of about 0.0005 inches in thickness.

4. A process as disclosed in claim 3 wherein said cross-machine extension is achieved by ribbing said extensible kraft paper with ribs of about 25 percent of the thickness of the paper.

5. A process as disclosed in claim 4 wherein said sheet forms means to adapt said mulch to the contour of the earth thereabout.

6. A process as disclosed in claim 2 wherein said cross-machine extension is achieved by ribbing said extensible kraft paper with ribs of about 25 percent of the thickness of the paper.

7. A process as disclosed in claim 1 wherein said lower layer is formed of a black-pigmented polyethylene coating of about 0.0005 inches in thickness.

8. A process as disclosed in claim 7 wherein said sheet forms means to adapt said mulch to the contour of the earth thereabout.

9. A process as disclosed in claim 1 wherein said sheet forms means to adapt said mulch to the contour of the earth thereabout.

* * * * *